United States Patent [19]

Strickland

[11] 4,202,292
[45] May 13, 1980

[54] MODULAR PIG CAGE ASSEMBLY

[76] Inventor: C. Gene Strickland, Spring Hope, N.C. 27882

[21] Appl. No.: 901,590

[22] Filed: May 1, 1978

[51] Int. Cl.² ............................................. A01K 1/02
[52] U.S. Cl. ........................................ 119/20; 119/27
[58] Field of Search ................ 119/20, 17, 18, 19, 119/27; 52/637, 236.7, 263

[56] References Cited

U.S. PATENT DOCUMENTS

| | | | |
|---|---|---|---|
| 2,303,615 | 12/1942 | Cobb et al. | 119/17 |
| 2,661,800 | 12/1953 | Reichenbach | 119/27 |
| 3,002,493 | 10/1961 | Galamba | 119/20 |
| 3,429,092 | 2/1969 | Perry et al. | 52/236.7 X |
| 3,541,994 | 11/1970 | Meng et al. | 119/20 |

*Primary Examiner*—Hugh R. Chamblee
*Attorney, Agent, or Firm*—Mills & Coats

[57] ABSTRACT

The present invention relates to a modular cage unit or assembly for confining animals such as pigs, and wherein in a preferred embodiment the modular cage assembly of the present invention as used to confine pigs forms two approximately four feet by four feet pen areas for confining a litter of pigs. The modular cage units are adapted to be stacked one over the other to form a vertical section of cages, and like vertical sections are preferably connected together in side-by-side relationship to form a plurality of horizontally aligned and vertically stacked modular cages assemblies.

13 Claims, 6 Drawing Figures

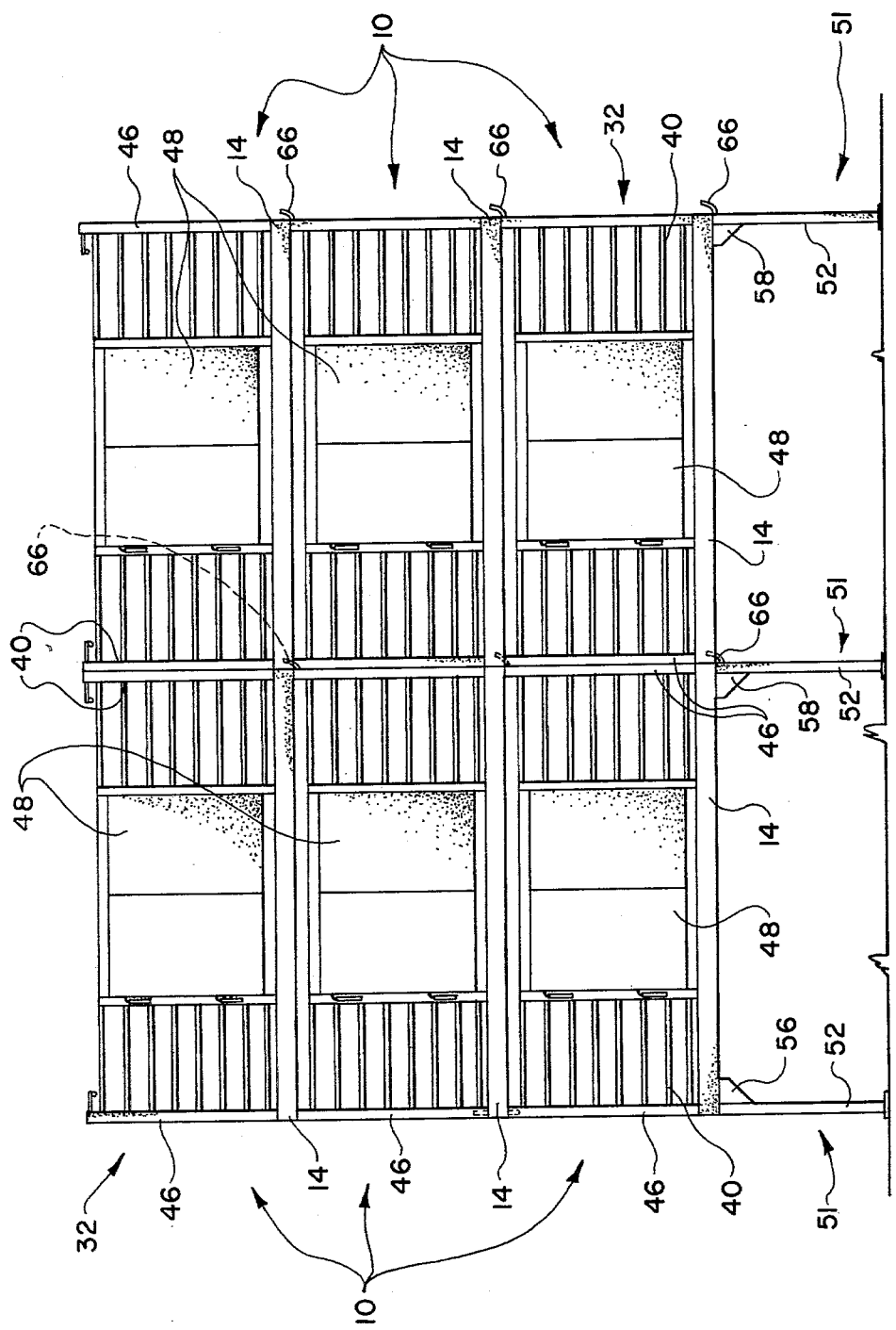

MODULAR PIG CAGE ASSEMBLY

The present invention relates to animal husbandry and to pen and caging structures for animals, and more particularly to a modular pig crate or cage structure for forming modular cages that are adapted to be vertically stacked and horizontally aligned in interconnected fashion.

BACKGROUND OF THE INVENTION

Today pigs, after being weaned, are placed in hog houses which typically includes a series of stalls formed about a concrete floor. It is usual practice after the pigs have been weaned to place the entire litter in a stall or in an area of the hog house to be fed until they reach a weight of approximately forty pounds each. Such hog houses today are essentially constructed for the convenience of people, and really are not designed for the pigs and for an economical and practical pig operation. This is illustrated by the fact, that many conventional hog houses today resemble a barn type structure and in such the small pigs move about the floor underneath a relatively high ceiling. The volume of the building structure is very poorly utilized since all of the pigs are housed about the concrete floor, and in the end, this type of structure is very expensive in terms of its capacity because of the very poor utilization of space within the hog house.

Moreover, in conventional hog houses, the pigs in the very early stages of growth, that is from the time they are weaned to approximately forty pounds, roam and move about a concrete floor which is often wet or damp, and cold or relatively cool. This often results in the pigs developing viruses, diseases, etc., and this increases the mortality rate of the pigs being raised and consequently reduces the profit and operating efficiency of the pig raising operation.

SUMMARY OF INVENTION

The present invention presents a modular cage system that when used in conjunction with a hog house or some other outer main structure forms a pig or hog house facility and is practical, relatively inexpensive in terms of capacity, and which in reality is designed for pigs and a pig operation and not simply for people.

In addition the modular cages of the present invention enable litters of pigs to be confined in respective individual pens formed by the modular cage units above the level of the floor where the surrounding environment is relatively dry and warm, thereby decreasing the mortality rate of the pigs in comparison to conventional hog houses where the pigs are housed and confined about a concrete floor.

More particularly, the present invention provides a basic modular cage assembly that is approximately, in a preferred embodiment, eight feet by four feet that is divided into two pens, with each of the divided pens being approximately four feet by four feet. Each modular cage assembly includes a perforated floor section and a plurality of rail panels secured about the perimeter of said floor section with a transverse divider rail extending across the floor section so as to divide the cage assembly into two pens. As preferably situated in a hog house structure, a plurality of the modular cage assemblies are vertically stacked one over the other to form a vertically stacked cage assembly, and a series of such vertically stacked cage assemblies are disposed or interconnected in side-by-side relationship to form a multiplicity of horizontally aligned and vertically stacked modular cage assemblies.

It is, therefore, an object of the present invention to provide a modular pig cage assembly that is adapted to be conveniently stacked and aligned with other like modular pig cage assemblies to form a multiplicity of pig cages or crates within a structure.

Another object of the present invention is to provide a modular pig cage network or system comprising a series of like modular cages wherein the modular system is easily erected and disassembled, and each individual modular cage unit is designed so as to be easy to put together and dismantled in a "knockdown" fashion.

Still a further object of the present invention is to provide a modular pig cage network or system that is adapted to be utilized in a new or existing hog house that greatly increases the effective pen area of the house without actually increasing the square footage of the hog house structure itself, and thereby give rise to a more efficient and less expensive hog house structure in terms of capacity.

Another object of the present invention is to provide a pig cage housing system that keeps the pigs relatively dry and warm and thereby reduces the mortality rate of such pigs being raised.

It is a further object of the present invention to provide a modular system of pig cages comprised of a series of modular cage units, wherein each cage unit is constructed alike and includes interchangeable component parts.

Still a further object of the present invention is to provide a modular pig cage unit that is adapted to be stacked with other like cage units to form a modular network or system of units, wherein each modular cage unit is designed with interconnecting stacking studs to form a rigid and sturdy stack of pig cages.

Other objects and advantages of the present invention will become apparent from a study of the following description and the accompanying drawings which are merely illustrative of the present invention.

BRIEF DESCRIPTION OF THE DRAWINGS

FIG. 6 is a side elevational view of a modular cage system comprised of a plurality of modular cage units stacked vertically and aligned horizontally.

MODULAR PIG CAGE UNIT OR ASSEMBLY

With further reference to the drawings, and particularly FIG. 6, there is shown therein a modular network or system of pig cages that may be utilized in a pig house or structure in accordance with present invention. The modular pig cage network or system illustrated therein comprises a series of like modular pig units or assemblies, indicated generally by the numeral 10, which are adapted to be stacked one over the other to form a vertically stacked modular section and wherein other like formed stacks of such modular cage units may be interconnected in side-by-side relationship to form a modular cage system including a multiplicity of horizontally aligned and vertically stacked modular pig cages.

Figure 1:
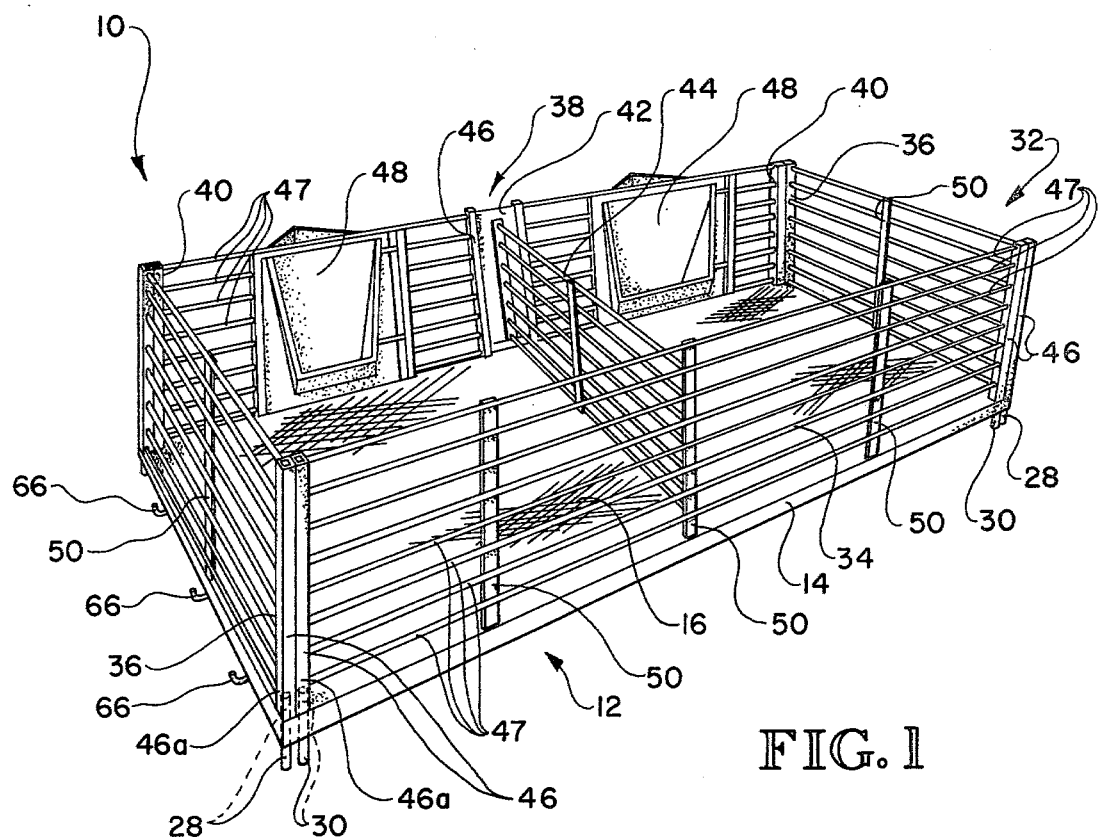
FIG. 1 is a perspective view of the modular cage unit or assembly of the present invention.
Figure 2:
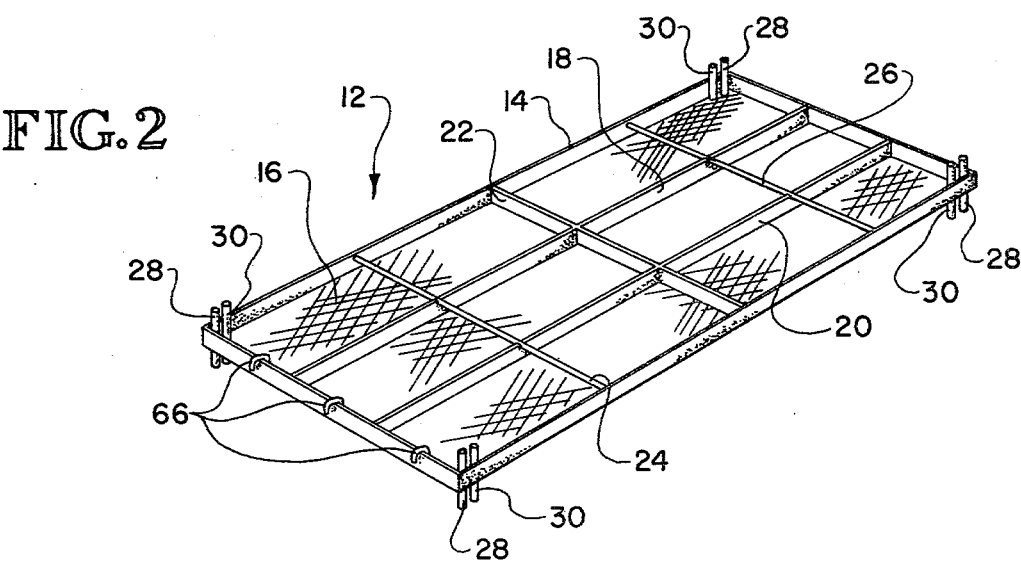
FIG. 2 is a perspective view of the floor section of the modular cage unit turned upside down.
Figure 3:
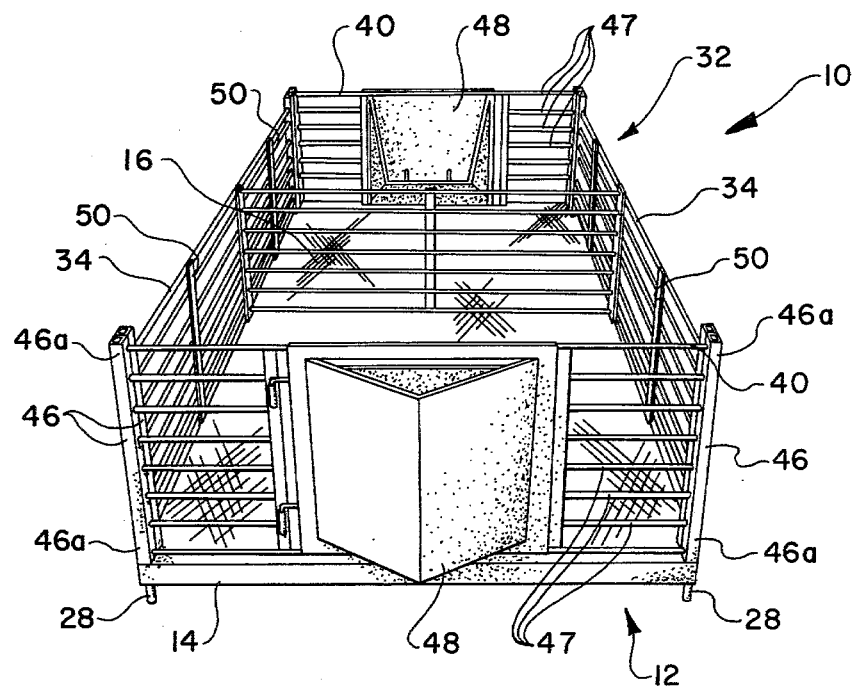
FIG. 3 is a perspective view of the modular cage unit or assembly with feeder end panels being situated about opposite ends thereof.

With reference to FIGS. 1 and 3, a modular pig cage unit or assembly 10 is shown therein and includes a rectangular floor section 12 having a metal band perimeter section 14 that supports a horizontal perforated floor 16 that is constructed of expanded metal or the like. Floor section 12 is reenforced by a pair of parallel extending longitudinal reenforcing members 18 and 20, and a center transverse reenforcing member 22. Flanking center transverse reenforcing member 22 and extending in parallel relationship therewith is a pair of transverse reenforcing members 24 and 26. This particular structure is designed to yield a sturdy and rugged floor structure that is capable of supporting well over thirteen forty-pound pigs about an area approximately four feet by four feet.

Disposed about the corner of each floor section is a pair of stacking studs 28 and 30. These stacking studs include an upper projecting end and a downward projecting end in which in both cases the opposite ends of the studs 28 and 30 project away from the perforated floor 16 and generally extend perpendicular to the perforated floor.

Secured around the entire perimeter of floor section 12 is a side rail panel assembly indicated generally by the numeral 32 and which includes a plurality of side panels disposed about floor section 12 so as to define a confined area about substantially the entire floor section. In one preferred embodiment such as shown in FIG. 1, the modular pig cage unit or assembly 10 includes one continuous side rail panel 34, two end rail panels 36, and one side rail panel assembly 38 comprised of two feeder sides or end panels 40 interconnected by a filler panel or plate 42. A divider panel 44 is secured by bolting or the like, transversely across the rectangular floor section 12 and is secured at opposite ends to the side rail panel 34 and the filler panel 40, so as to divide the modular pig cage assembly into two generally equal pen areas.

Panels 34, 36 and 40 each include a pair of horizontally spaced apart end posts 46 interconnected by a series of vertically spaced, horizontally extending retaining members 47. At selected space intervals along each such panel, there is provided a vertical reenforcing member 50 that extends in parallel relationship to the end posts 46 of each respective panel.

Viewing each end post 46, it is seen that the same is comprised of an open tubular metal stock member, and as illustrated the open channel upper and lower portions thereof define a stud receiving area 46a for receiving respective stacking studs 28 and 30, as particularly illustrated in the drawings.

In the preferred embodiment, the basic modular cage unit or assembly 10 is designed such that two feeder side or end panels 40 plus the filler panel or plate 42 is of equal length to the one continuous side rail panel 34, and that an end panel 36 and a feeder side or end panel 40 is of equal length in order that the two can be interchanged in appropriate circumstances. For example, and with reference to FIG. 3, the same basic modular pig cage unit or assembly 10 is provided with two side rail panels 34, and wherein the ends of the unit are confined by two feeder side or end panels 40. It is appreciated that each of the feeder side or end panels 40 are provided with an attachable feeder 40 of a conventional design that is adapted to receive feed from the top and allow access to the contained feed from inside either of the defined pen areas within a modular unit 10.

Although the particular size of the modular cage unit or assembly can vary in accordance with the particular installation involved and the needs of that application, in a preferred embodiment, as illustrated herein, the modular cage unit or assembly 10 is basically of a four foot by eight foot construction, and wherein by the provision of the divider panels 44, the modular cage unit or assembly is divided into two pens which are each approximately four feet by four feet.

Figure 5:
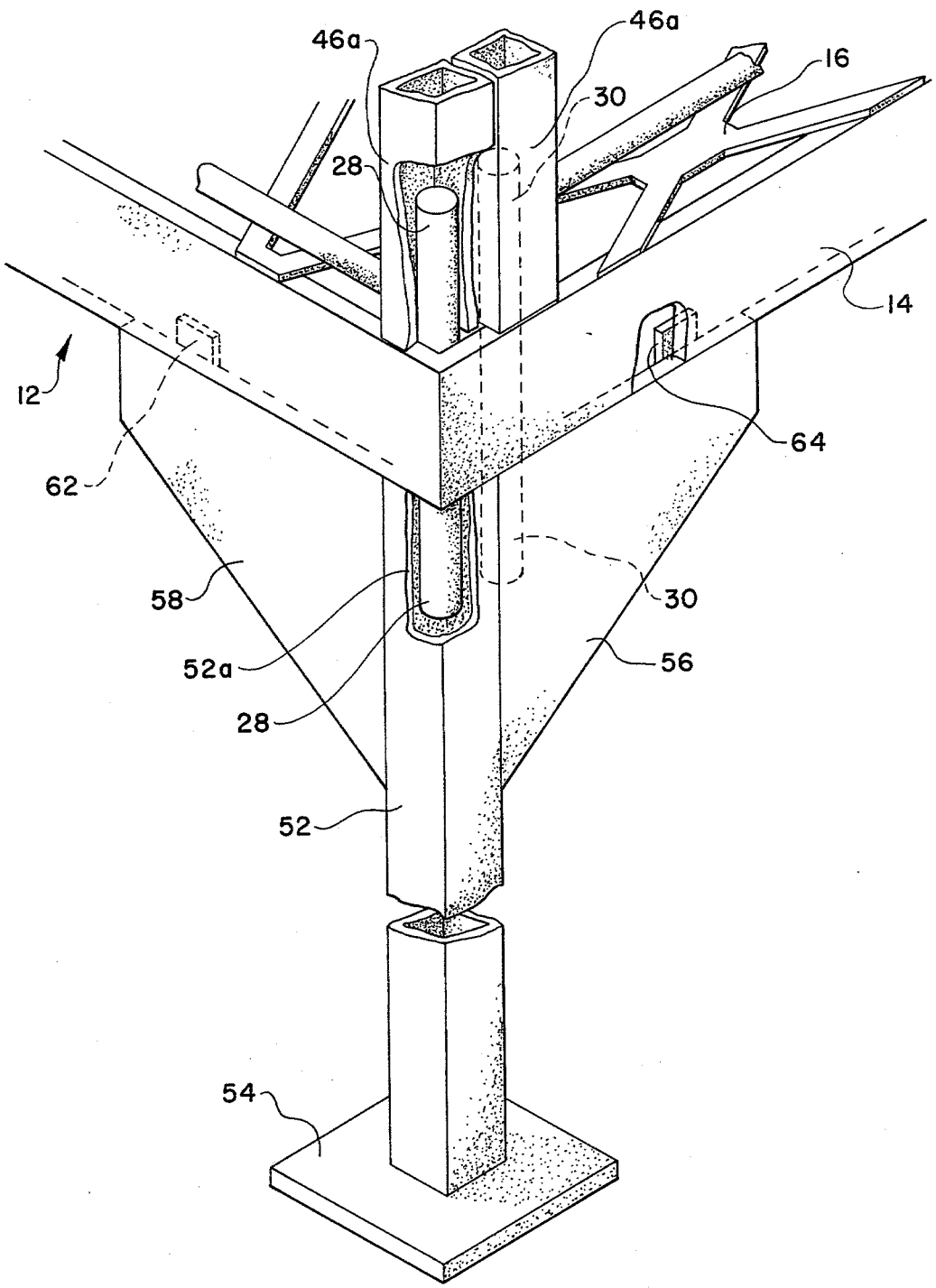
FIG. 5 is a fragmentary perspective view of a supporting leg structure for a modular cage unit.

With reference to FIG. 5, there is shown a leg structure, indicated generally by the numeral 51, which can be utilized to support the lowermost modular unit of a stacked assembly above the floor level of the structure in order that the pigs in the lowermost pen areas are supported in a dry and warm environment above the floor.

With particular reference to the leg structure 51, it is appreciated that the same can be utilized to support the lowermost modular cage units 10 of an assembled modular section of such units stacked by positioning the leg structure underneath appropriate corners of the modular cage unit or assembly 10. Viewing the structure of leg 51, it is seen that the same includes an elongated leg member 52 that in the preferred embodiment is constructed of open tubular stock metal that is adapted to be supported about the ground by a base 54. The top portion of leg 52 forms a stud receiving area 52a for receiving respective stacking studs of an above floor section. Secured about the upper portion of the elongated leg 52 is a pair of gussets 56 and 58 that extend from the leg 52 so as to form approximately a ninety degree angle. The placement of the gussets 56 and 58 is done such that the upper edge thereof will align with and support the lower edge of the perimeter 14 of an above floor section 12. To stabilize floor section 12 about a leg structure 51, there is provided a pair of locking tabs 62 and 64 that are fixed to the interior side of respective gussets 56 and 58 and extends upwardly therefrom adjacent the interior side of the perimeter section 14 surrounding the floor section 12. This stabilizes the floor section about the respective leg structures 51 and generally maintains proper alignment between the floor section and the legs so as to form an effective support structure.

To form a modular network or system of cages, the individual modular units 10 are stacked one over the other to form vertical modular sections, and this is particularly illustrated in FIG. 6. In this embodiment, the respective modular units 10 comprising the respective vertical modular sections are of the type where the end panels are of the feeder type and as indicated in the foregoing specification are referred to by the numeral 40. Therefore, it is appreciated that in installation, that these vertical sections would be stacked in side-by-side relationship in order that the operator could gain access to the feeders 48 attached to respective feeder end panels 40.

As illustrated in FIG. 6, the vertical modular sections shown therein are three modules high and are supported above the floor of the structure by legs 51, but it is understood that if desired the lowermost modular unit could be placed directly adjacent the floor and the need for the legs would be obviated. In the embodiment illustrated in FIG. 6, the lowermost modular unit in a vertical section is supported by leg structures 51, in the same manner as already explained hereinbefore, and the second modular unit is stacked directly over the first lowermost modular unit by aligning the stacking studs 28 and 30 with the upper stud receiving means 46a in the end post 46 of the respective side railing panels 32 of the lowermost modular cage unit. This means that each pair of stacking studs 28 and 30 in the respective corners of the floor section 12 would project downwardly into the stud receiving means 46a of the two end posts 46 situated in that vicinity. In the case where the feeder side or end panels 40 are placed about one side of the floor section 12 as opposed to the end, then in this case, it would be appropriate for the floor sections to include intermediate stacking studs about one side of the floor section to properly align with the intermediate end posts 46 that would be disposed adjacent the filler panel 42, as shown in the embodiment illustrated in FIG. 1. It is appreciated that the design of the modular cage units or assemblies 10 allow the same to be conveniently and easily stacked one above the other, as many as three modules high, to form the vertical section of modular cage units or assemblies.

Continuing to refer to FIG. 6, like vertical modular sections, as just discussed, are placed in a side-by-side relationship and can be interconnected to form a row of vertical modular sections. In this regard, it is appreciated that either on the side or end of respective floor sections 12, there can be provided a plurality of spaced apart hooks 66 as shown in FIGS. 1 and 6, which allow an adjacent horizontally aligned modular cage unit or assembly 10 to be supported along one end or side adjacent an already supported modular unit. It is appreciated that the respective hooks 66 are secured about the perimeter section 14 of respective floor sections 12 and project outwardly therefrom in a curled fashion and define a seat for receiving and supporting a corresponding perimeter section 14 of an adjacent floor section 12. As illustrated in FIG. 6, where the respective vertical modular sections are aligned in side-by-side relationship, by utilizing the hooks 66 to support one side of an adjacent vertical modular section, this in effect does away with the requirement of requiring leg structures along the side or end of the modular cage unit or assembly 10 that is supported by the hooks 66, and thereby reduces the overall cost of the modular cage network or system.

Figure 4:
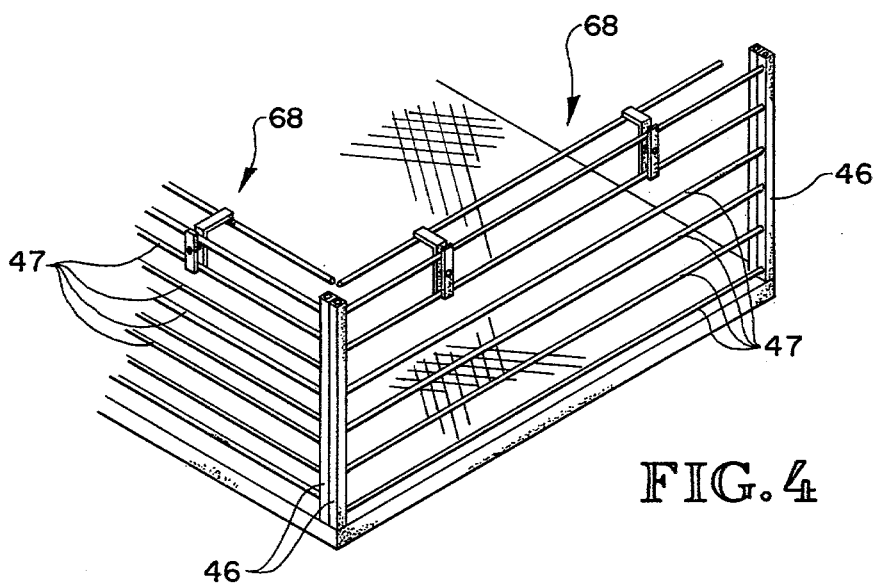
FIG. 4 is a fragmentary view of a rail panel illustrating an attaching guard rail for the top thereof.

In FIG. 4, an attachable guard rail assembly 68 is shown therein. Such is designed to be easily attached by bolting to the rail panels 32 about the uppermost modular units of a vertical modular section to prevent the pigs from jumping from these cages.

From the foregoing specification, it is appreciated that the modular cage network or system of the present invention presents a very efficient confining structure for pigs and other animals as well, and the utilization of such greatly increases the effective utilization area of a structure without actually increasing the cost of the structure itself. In addition, the present invention in the case of raising pigs from a weaning stage to approximately forty pounds greatly reduces the mortality rate and consequently should increase the profit of the operator. The modular cage system or network of the present invention has been described herein in relationship to raising pigs, but it will be understood and appreciated by those skilled in the art that the same could be utilized for other animals as well. Finally, the modular cage units or assemblies described hereinabove include the feature of being easily assembled and disassembled and can be moved from one existing structure to another.

The terms "upper," "lower," "forward," "rearward," etc., have been used herein merely for the convenience of the foregoing specification and in the appended claims to describe the modular pig cage assembly and its parts as oriented in the drawings. It is to be understood, however, that these terms are in no way limiting to the invention since the modular pig cage assembly may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A modular cage assembly for confining animals such as pigs and the like comprising: a floor section having an perforated metal floor; a plurality of vertically oriented stacking studs secured about the perimeter of said floor section at selected intervals, said stacking studs including upwardly projecting studs that project above the perforated floor and downwardly projections studs that project downwardly from the perforated floor; a plurality of detachable and independent rail panels having post means adapted to be supported about the perimeter of said floor section, said plurality of rail panels including at least two side rail panels and at least two end rail panels; stud receiving means formed in said post means at both the top and bottom thereof for receiving respective stacking studs projecting from said floor section, whereby individual rail panels are supported about the perimeter of said floor section by inserting upper projecting stacking studs into the studs receiving means formed in the bottom of said post means, and wherein modular cages may be stacked and disposed one above the other by situating a floor section over said detachable rail panels by inserting downwardly projecting stacking studs of a floor sections into the stud receiving means formed about the top of said post means such that certain floor sections are directly supported by underlying detachable rail panels.

2. The modular cage assembly of claim 1 wherein said plurality of rail panels includes a divider panel adapted to extend transversely between at least two other rail panels supported about the perimeter of said floor section so as to divide said modular cage into at least two pens.

3. The modular cage assembly of claim 1 wherein said floor section includes a plurality of support hooks secured about a perimeter section thereof with said support hooks extending from said floor section for engaging and supporting a portion of a perimeter section of another floor section in order that said modular cages may be horizontally aligned and interconnected by said support hooks without requiring vertical leg supports to support the area being supported by said hooks.

4. The modular cage assembly of claim 3 wherein the plurality of rail panels of said modular cage assembly includes a divider panel adapted to be secured transversely between two other rail panels secured about the perimeter of said floor section so as to effectively divide said modular cage into two pens; and wherein said floor section is of a rectangular shape including two sides longer than two ends, and wherein said end rail panels are interchangeable and can be appropriately fitted about either the side or ends of said rectangular shaped floor section.

5. The modular cage assembly of claim 4 wherein there is provided a plurality of elongated leg members for supporting the lowermost modular cage unit of a series of vertically stacked modular cage assemblies, and wherein each leg member includes an elongated leg and an upper framework connecting structure including a stud receiving channel for receiving a respective downwardly projecting stacking stud from the lowermost floor section of the vertically stacked series of modular cages, and locking tabs extended from said connecting framework structure for locking engagement with said floor section.

6. The modular cage assembly of claim 5 wherein the perimeter of said floor section includes a vertically oriented metal band that extends around said floor section and wherein about the corner of each floor section there is provided at least two of the downwardly projecting stacking studs; and wherein said connecting framework structure of each leg includes two gussets extending from said leg at approximately a 90-degree angle and wherein said gussets are so spaced so as to align with and support said vertical metal band disposed about the perimeter of said floor section and wherein a locking tab is secured to each gusset and extends upwardly therefrom interiorly of said metal band so as to stablize said floor section about one or more legs.

7. The modular cage assembly of claim 3 further including a guard rail assembly adapted to be attached to said rail panels for preventing animals in an upper disposed open top cage from jumping therefrom.

8. A vertically stacked and horizontally aligned modular cage system for confining animals or the like within respective cages formed, comprising: a plurality of horizontally aligned and vertically stacked cage floor sections, each cage floor section including a perimeter and a perforated floor, and a plurality of stacking studs disposed at selected locations about the perimeter of said floor section with said stacking studs including upwardly projecting studs that project above the floor and downardly projecting stacking studs that project downwardly from said floor; a series of rail panels supported about the perimeter of each floor section with each floor section having supported therearound at least two side rail panels and at least two end rail panels and wherein said rail panels include stud receiving means associated therewith and formed about both the top and bottom of said rail panels, whereby respective rail panels are confined about respective floor sections by positioning respective rail assemblies about the perimeter of said floor section such that upwardly projecting studs project to and into said stud receiving means formed about the bottom of said rail panels, and wherein vertical cage stacking is achieved by placing respective floor sections above the top portion of said rail panels and particularly directing the downwardly projecting studs from respective floor sections into the stud receiving means formed about the top of said rail panels in order that floor sections above the lowermost level are supported by the rail panels extending upwardly from the adjacent lowermost floor sections; and hook support means extending from a perimeter section of certain floor sections of said cage network for engaging and supporting an adjacent floor section for effectively reducing the number of leg supports required for supporting the lower level of floor sections of said modular cage network.

9. The modular cage system of claim 8 wherein about the uppermost cage level of the modular cage system there is provided guard rail means attachable to said rail panels for preventing animals confined about the uppermost level from jumping therefrom; and wherein said plurality of rail panels for each floor section includes a transverse divider rail panel that extends transversely between two other rail panels extending about the perimeter of a respective floor section in order to effectively divide each floor section into two generally equal sized cage areas.

10. The modular cage system of claim 9 wherein the lower level floor sections of said cage network is supported by a plurality of leg members with each leg member including an upper attaching framework structure provided with stud receiving means for receiving downwardly projecting studs particularly situated in corner sections of said lower level floor sections so as to provide a connection between lower level floor sections and said legs.

11. The modular cage system of claim 10 wherein each floor section is generally rectangularly shaped and wherein the side rail panels are generally at least twice as long as said end rail panels and wherein said end rail panels include means for receiving feeder units and are particularly sized such that they can be appropriately arranged in multiple aligned connected sections to generally enclose respective side portions of said floor sections, whereby feeder units may be placed on either the side or ends of the modular cage system.

12. A modular, knock-down vertically stacked cage system for confining animals or the like within respective cages formed, comprising: a plurality of horizontally oriented and vertically stacked cage floor sections, each cage floor section including a perimeter and a perforated floor, and a plurality of stacking studs disposed at selected locations about the perimeter of said floor section with said stacking studs including upwardly projecting studs that project above the floor and downwardly projecting stacking studs that project downwardly from said floor; a series of detachable and independent rail panels having post means and which extend between floor sections, and wherein said rail panels are secured about the perimeter of each floor section such that each floor section has supported therearound at least two side rail panels and at least two end rail panels and wherein said post means include stud receiving means associated therewith and formed about both the top and bottom thereof, whereby respective rail panels are confined about and between respective floor sections by positioning respective rail assemblies about the perimeter of said floor section such the upwardly projecting studs project to and into said stud receiving means of said post means, and wherein vertical cage stacking is achieved by placing respective floor sections above the top portion of said rail panels and particularly directing the downwardly projecting studs from respective floor sections into the stud receiving means formed about the top of said post means in order that floor sections above the lowermost level are directly supported by the rail panels extending upwardly from the adjacent lowermost floor sections.

13. A vertically stacked and horizontally aligned modular cage system for confining animals or the like within respective cages formed, comprising: a plurality of horizontally aligned and vertically stacked cage floor sections, each cage floor section including a perimeter and a perforated floor, and rail attaching means disposed at selected locations about the perimeter of said floor sections; a series of independent and detachable rail panels attached to said rail attaching means and supported about the perimeter of each floor section with each floor section having supported therearound at least two side rail panels and at least two end rail panels and wherein said rail panels include means for directly engaging and supporting individual floor sections thereover and further includes receiving means associated with said rail panels and formed about both the top and bottom of said rail panels for receiving said rail attaching means, whereby respective rail panels are confined about respective floor sections by positioning respective rail panels about the perimeter of said floor section and wherein vertical cage stacking is achieved by placing respective floor sections above the top portion of said rail panels and particularly attaching said rail attaching means with said receiving means in order that floor sections above the lowermost level are supported by the rail panels extending upwardly from the adjacent lowermost floor sections; and hook support means extending from a perimeter section of certain floor sections of said cage network for engaging and supporting an adjacent floor section for effectively reducing the number of leg supports required for supporting the lower level of floor sections of said modular cage network.

* * * * *